United States Patent [19]

Snover et al.

[11] 4,210,621

[45] Jul. 1, 1980

[54] METHOD OF APPLYING VERMICULAR EXPANDED GRAPHITE COMPOSITE MATERIAL

[75] Inventors: John A. Snover; R. Scott Caines, both of Midland, Mich.

[73] Assignee: The Dow Chemical Company, Midland, Mich.

[21] Appl. No.: 889,309

[22] Filed: Mar. 23, 1978

[51] Int. Cl.$^2$ .............................................. B29C 17/06
[52] U.S. Cl. .................................... 264/516; 264/517; 264/570; 264/573; 264/269
[58] Field of Search ................ 264/88, 102, 110, 120, 264/314, 313, 516, 517, 570, 573, 269

[56] References Cited

U.S. PATENT DOCUMENTS

| | | | |
|---|---|---|---|
| 2,977,269 | 3/1961 | Nerwick | 264/102 |
| 3,424,830 | 1/1969 | Sfondrini et al. | 264/314 |
| 3,492,197 | 1/1970 | Olstowski et al. | 161/183 |
| 3,577,635 | 5/1971 | Bergman | 264/88 |

*Primary Examiner*—Donald J. Arnold
*Assistant Examiner*—James R. Hall
*Attorney, Agent, or Firm*—James M. Kuszaj; Charles Enright

[57] ABSTRACT

A method of applying a vermicular expanded graphite composite material to the interior surface of a conduit by a two-step in situ compression process is disclosed.

10 Claims, No Drawings

METHOD OF APPLYING VERMICULAR EXPANDED GRAPHITE COMPOSITE MATERIAL

BACKGROUND OF THE INVENTION

Vermicular expanded graphite is a low bulk density, (usually between 0.002 and 0.02 gram per cubic centimeter), particulate, worm-like form of graphite. It is prepared by treating natural flake graphite with an intercalating agent such as fuming nitric acid, fuming sulfuric acid, mixtures of concentrated nitric and sulfuric acid, and the like. The treated graphite is then heated to a high temperature, e.g., above 500° C., to expand the natural flake graphite to the light weight vermicular form. The preparation of the vermicular expanded graphite is well known in the art, and is described in greater detail, for example, in U.S. Pat. Nos. 3,389,964 and 3,323,869, which are incorporated herein by reference.

Vermicular expanded graphite can be mixed with corrosion resistant resins and compressed into various shapes and forms or onto various substrates or supports. The resulting compressed vermicular graphite composite material has many desirable properties including, for example, high electrical and thermal conductivity, high anisotropic ratios, low fluid permeability, resistance to high temperature oxidation, and excellent mechanical properties. Because of these properties, compressed forms of vermicular expanded graphite composite material have found utility as coatings for various metal substrates, for example, as described in U.S. Pat. No. 3,492,197.

Various methods of applying vermicular expanded graphite materials to substrates have been developed. For example, U.S. Pat. No. 3,475,244 describes a process in which compressed vermicular graphite is first treated with a re-expanding agent and heated to produce re-expansion of the graphite surface. The re-expanded graphite is then pressure bonded to the substrate by compression. In another method, vermicular expanded graphite is formed into an integral structure by methods such as those described, for example, in U.S. Pat. No. 3,440,311. The integral structure is then attached to the substrate by use of an adhesive.

One difficulty with these methods is that the resulting vermicular expanded graphite composite structure is especially susceptible to shrinkage and separation at the graphite-substrate interface. Another disadvantage lies in the difficulty of applying a uniform layer of the vermicular expanded graphite composite material to an irregularly-shaped or curved surface. A third disadvantage is that the orientation of the graphite achieved by these methods is often such that there is an undesirable increase in the fluid permeability of the compressed graphite.

Therefore, a need exist for a method of applying a vermicular expanded graphite composite material to the interior surface of a conduit in a manner which results in a uniform coating which is substantially impervious to fluids.

SUMMARY OF THE INVENTION

The present invention is a method for applying a vermicular expanded graphite composite material to the interior surface of a conduit. The method comprises: (a) providing a supply of vermicular expanded graphite composite material containing from about 3 to about 50 percent by weight of a corrosion resistant resin; (b) positioning within the interior of the conduit a pressure actuated, resiliently expandable element having substantially the same longitudinal dimensions and substantially the same peripheral contour as the interior surface of the conduit, but having an initial outside diameter smaller than the inside diameter of the conduit; (c) charging the vermicular expanded graphite composite material into the interior of the conduit such that the composite material is loosely disposed within the annular space formed between the interior surface of the conduit and the outer surface of the pressure actuated resiliently expandable element; (d) applying sufficient pressure within the expandable element to compress the composite material against the interior surface of the conduit; and (e) isostatically compressing the composite layer under sufficient pressure to form a substantially smooth, fluid impervious lining of the composite material on the interior surface of the conduit.

DETAILED DESCRIPTION OF THE INVENTION

Vermicular expanded graphite composite materials are produced by blending a supply of vermicular expanded graphite with an inorganic or organic resin in amounts of about 3 to about 50 weight percent resin based on the total weight of the vermicular expanded graphite-resin mixture. A detailed description of the formation of such vermicular expanded graphite composite material is described in a commonly owned co-pending U.S. patent application, Ser. No. 889,308, filed Mar. 23, 1978, for "Vermicular Expanded Graphite Composite Material", which application is incorporated herein by reference.

The vermicular expanded graphite composite material can be used as a chemically inert, fluid impermeable material for coating corrosion-vulnerable substrates. Such substrates are generally constructed of conductive metals such as aluminum, magnesium, copper, molybdenum, iron, nickel, silver, titanium, or of ceramic material. The substrates may have any shape, however, the vermicular expanded graphite composite material is especially advantageous for coating the interior portion of substrates having a generally tubular cross-section such as a pipe and other conduit.

The present manner of applying a vermicular expanded graphite composite material to the interior surface of a conduit involves positioning with the interior of the conduit a pressure actuated resiliently expandable element, such as a rubber tube. The rubber tube has substantially at least the same longitudinal dimensions and substantially the same peripheral contour as the interior surface of the conduit, but has its initial outside diameter smaller than the inside of the conduit. Thus, the rubber tubing can be concentrically located within the interior of a conduit to be lined.

After the rubber tubing is positioned within the conduit, the vermicular expanded graphite composite material is introduced into the annular space formed between the internal surface of the conduit, and the outer surface of the rubber tubing. The size of the annular space varies with the inside diameter of the conduit. For example, when a 2 inch inside diameter conduit is employed, the annular space is generally from about ¼ inch to about ¾ inch in diameter.

Before introduction of the vermicular expanded graphite composite material into the annular space, the material is preferably subjected to sufficient impacting force to at least partially agglomerate the individual vermicular expanded graphite composite particles. In one embodiment, the impacting force is supplied by mixing the vermicular expanded graphite composite material in a blender for about 20 to about 30 seconds. Vermicular expanded graphite composite material so treated has been found to exhibit superior compacting properties.

When the annular space is filled with the loose vermicular expanded graphite composite material, sufficient pressure is applied to the interior of the rubber tubing to compress the vermicular expanded graphite composite material against the interior surface of the conduit. The pressure is applied by introducing a pressurized fluid, such as water or gas, into the interior of the rubber tubing. The pressure applied to the composite material by the compression is generally from about 100 to about 1,000 pounds per square inch (psi) and preferably from about 100 to about 500 (psi). As a result of this compression, a layer of the vermicular expanded graphite composite material is deposited on the interior surface of the conduit. The thickness of this layer depends upon the density of vermicular expanded graphite composite material introduced into the annular space, the diameter of the conduit, the amount of pressure applied against said vermicular expanded graphite composite material, and the ultimate end use of the lined conduit.

The first stage compression process described above may be repeated and additional amounts of vermicular expanded graphite composite material introduced into the conduit and compressed until a final coating of predetermined thickness has been achieved. Generally, the final coating thickness will depend on the diameter of the conduit. For example, when a 2 inch inside diameter conduit is employed, a final coating thickness of from about 0.10 to about 0.20 inch has been found to be satisfactory.

When the desired coating thickness has been achieved, the rubber tubing is removed from the interior of the conduit and replaced with a rubber bag which fits around the exterior of the conduit and seals the surface of the deposited vermicular expanded graphite composite material from the environment. The entire conduit is then isostatically compressed by applying sufficient force in all directions to form a substantially smooth, fluid impervious lining of the vermicular expanded graphite composite material on the interior surface of the conduit.

The desired thickness of the isostatically compressed lining depends upon the ultimate end use and upon the diameter of the conduit. For example when a 2 inch inside diameter metal conduit is to be employed to carry a highly corrosive fluid, such as hydrochloric acid, an isostatically compressed lining having a thickness of from about 0.05 to about 0.10 inch has been found to be satisfactory.

The isostatic compression is generally done in a conventional apparatus at a pressure of from about 5,000 to about 100,000 psi. Pressures of from about 15,000 to about 30,000 psi are preferred. Pressures in excess of 100,000 psi may be used if desired. However, pressures in excess of 100,000 psi do not markedly improve the fluid impermeability of the composite material, and are therefore not generally employed.

When the conduit to be lined has a flanged end portion, the method of lining the interior with the vermicular expanded graphite composite material can be modified slightly. The modification involves providing a supply of vermicular expanded graphite composite material and precompressing the expanded vermicular graphite composite material into a structure which conforms to the interior surface of the flanged portion of the conduit. This preformed structure has a longitudinally extending portion which corresponds to the barrel of the conduit but which extends in concentric alignment into only a portion of the barrel. These precompressed structures are positioned within the interior of the conduit at each flanged end portion. The barrel portion of the conduit is lined with the expanded vermicular graphite substantially as described above.

The advantages and practice of the present invention are further illustrated by the following examples.

EXAMPLE I

Preparation of Compressed Vermicular Expanded Graphite Composite Material

A commercially available natural flake graphite (Cummings-Moore #3061) having a flake size range of from about 10 mesh (U.S. Standard Series) to about 50 mesh was wetted with an acidic mixture of about 85 percent by weight concentrated sulfuric acid ($H_2SO_4$) and about 15 percent by weight concentrated nitric acid ($HNO_3$). The graphite was then washed free of excess acid. The so-acidified graphite flakes were heated with a propane torch to about 1000° C. thereby producing a loose particulate worm-like product having an apparent bulk density of from about 0.1 to about 0.5 pounds per cubic foot.

A 6 gram (g) sample of a commercially available aqueous dispersion of polytetrafluoroethylene resin particles 0.05 to 0.5 micron in size was employed as the corrosion resistant resin. (TEFLON ® 30 TFE Fluorocarbon resin, manufactured by E. I. duPont de Nemours & Company, Inc.) The dispersion contained from about 59 to 61 percent by weight solids. The dispersion was diluted with approximately 750 milliliters (ml) of water, and placed in the aluminum cup of a spray gun (DeVilbiss Co., Type CGA, Series 502), operated at about one pound pressure.

A 120 g sample of the vermicular expanded graphite was weighed out and placed in a round, 20 gallon drum. The drum was rotated at about 30 revolutions per minute (rpm) while the polytetrafluoroethylene resin dispersion was sprayed at a rate of about 100 ml/minute on the expanded graphite. After application of the dispersion, the treated vermicular expanded graphite material was removed from the drum and heated to about 120° C. to remove the water. The dried material was then heated to about 360° C. to about 372° C. for about four hours to sinter the deposited resin. The dried product was removed and analyzed. The product was a vermicular expanded graphite composite material containing about 3 percent by weight of polytetrafluoroethylene resin particles.

EXAMPLE II

Lining Conduit with Vermicular Expanded Composite Material

An excellent utility for the compressed vermicular expanded graphite composite material is to form it into a substantially smooth, fluid impervious, internal lining for a metallic conduit.

PART (A)

A seven inch long spool piece of schedule 40 flanged steel pipe having a 2 inch inside diameter was lined with a vermicular expanded graphite composite material containing about 12 percent by weight of polytetrafluoroethylene. The composite material was produced substantially as described in Example I.

Two 50 g portions of the vermicular expanded graphite composite material were compressed in a cylindrical die of 4 inch inside diameter using about 250 pounds per square inch compression force to form a ring. This ring conformed to the interior surface of the spool piece and extended about one inch around the inside of each flanged portion of the pipe and about 1 inch into the cylindrical barrel portion of the pipe. The ring was compressed against the surface of the spool piece by the application of about 300 psig force.

Blind flanges, which are drilled and tapped to take tube to pipe fittings (for example, a ¼ inch tube to ⅜ inch male pipe Swagelok fitting), were bolted on each of the flanged portions of the spool piece after the composite end pieces described above were in place. A piece of 5/16 inch inside diameter 1/16 inch wall thickness amber rubber tubing was stretched about twice its length (100%) over a piece of ¼ inch metal tubing about 14 inches in length. The metal tubing was then positioned within the interior of the spool piece by passing the tubing through the fittings on each flange by means of plastic ferrules which were compressed onto the rubber tube. Small holes in the ¼ inch metal tubing allowed for water to expand the rubber tube concentrically inside of the 2 inch steel pipe.

Portions of the vermicular expanded graphite composite material were agglomerated in a Waring Blender for about 20-30 seconds, and then introduced into the interior of the 2 inch steel pipe through a valve in one of the end flanges. The vermicular expanded graphite composite material loosely fitted into the annular space between the rubber tube and the inner wall of the 2 inch steel pipe. The air was removed from this space by evacuation with a vacuum pump communicating with the space through a porous plug in one of the end flanges. The rubber tube was then expanded with water pressure to compress the composite material onto the 2 inch pipe wall using about 500 psig compression force. This procedure was repeated until the thickness of the composite material on the wall of the 2 inch pipe was about 0.2 inch.

The blind end flanges were then removed and the spool piece was placed in a rubber bag which conformed to the interior contours of the spool piece. The air was removed from the bag with a vacuum pump and the bag was sealed off. The spool piece was then placed in an isostatic pressure vessel (such as Autoclave Model IP 12-36-30) and the pressure was increased to about 25,000 psig. This pressure was maintained for about 60 seconds, and then the spool piece was removed. Examination of the lining indicated that the composite material had been compressed into a substantially monolithic layer on the interior surface of the spool piece.

PART (B)

A seven inch long spool piece of schedule 40 flanged steel pipe having a 2 inch inside diameter was fitted with the composite end pieces described in Part (A).

In place of the straight rubber tubing used in Part (A), a "finger" type rubber tubing was employed. This tubing had a ½ inch inside diameter and a ¾ inch outside diameter and was supported on a ⅜ inch mandrel which passed upward through an aperture in the bottom flange and extended through the center of the spool piece substantially the entire length of the spool piece. The top portion of the tubing was sealed shut with rubber cement. The top portion of the spool piece was then connected via an aperture in the flange, to the opening in a 2 inch ball valve (Jamesbury Brass, 2 inch ball valve). This valve was opened, filled with the vermicular expanded graphite composite material and closed. The air was removed from the annular space between the rubber "finger" tube and the inner wall of the 2 inch steel pipe by pulling a vacuum through the ball valve. The "finger" tube was then expanded by introducing water into the tube. The expanding tube compressed the loose vermicular expanded graphite composite material onto the pipe walls at a pressure of from about 100 to about 500 psig. This procedure was repeated until the thickness of the composite material on the wall of the 2 inch pipe was about 0.2 inch.

The spool piece was isostatically compressed as described in Part A.

The use of ball valve and "finger" tube was found to greatly facilitate the multiple loadings used to build up the desired graphite composite wall thickness.

PART (C)

In another embodiment of the basic lining procedure described in Part (A), the preformed compressed graphite composite end pieces were not employed. Instead the internal rubber tubing was shaped to conform not only to the cylindrical barrel portion of the spool piece, but also to the outwardly extending flanged portions. A metal ring spacer was then placed between the flanged portions of the spool piece and the flanged end pieces. The loose vermicular expanded graphite composite material was introduced into the annular space between the pipe wall and the tubing by unbolting one of the flanged end pieces. The composite material was compressed as described in Part (A).

This embodiment has the advantage of producing the lining in one continuous piece, rather than by the two piece method used in both Parts (A) and (B).

PART (D)

For comparative purposes, the composite material of Example I was used to line the inner cylindrical barrel surface of a steel pipe 12 inches long with an inside diameter of 2 inches by a "rolled sheet" technique.

In this method, eight 8-inch square sheets of compressed vermicular expanded graphite composite material were made by compressing vermicular expanded graphite composite material under a pressure of 312.5 pounds per square inch. These eight sheets were then wrapped around a 1.75 inch outside diameter pipe overlapping in a brickwork manner in order to build up a tubular graphite shell around the 1.75 inch pipe. The 1.75 inch steel pipe with the graphite was then inserted into the 2 inch inside diameter pipe. The 1.75 inch pipe was withdrawn leaving the graphite lining inside the 2 inch inside diameter pipe. A rubber bag designed for isostatic pressing was then inserted into the center of the graphite lined pipe. The bag was sealed off at both ends which isolated the graphite lining and the inside of the 2 inch pipe from external conditions. The rubber bag was designed so that water could flow through the center which was tubular shaped. A vacuum was then drawn on a ⅛ inch hole drilled in the pipe and the air that was trapped in the lining was removed. The ⅛ inch hole was sealed and the vacuum left on the pipe. The pipe was placed in a hydrostatic compression chamber where it was pressured up to 9000 pounds per square inch of pressure. The pressure was bled off slowly back to atmospheric pressure. The pipe was then removed from the hydrostatic chamber and the rubber bag removed.

The lining was examined and found to contain a large number of grooves. In contrast, the lining produced by the process of the present invention produced a uniform, smooth lining without the production of grooves.

EXAMPLE III

Several samples of the 7 inch long, 2 inch inside diameter spool pieces lined with the composite material by the methods described in Example II were subjected to a variety of corrosive materials to determine their resistance to fluid permeation. Table I summarizes the results of these tests. The tests were considered failures if the corrosive material penetrated a portion of the lining and attacked the metal substrate.

It is readily seen that the composite materials lining of the present invention is surprisingly quite impervious to a variety of corrosive fluids. The one reported failure is attributed to the presence of excessive amounts of bromine, which is well known in the art to attack graphite.

TABLE I

| Corrosive Material | Time (Months) | Failure |
|---|---|---|
| 20% HCl soluton @ 80° C. | 4 | No |
| Mixture of chlorinated benzene and HCl | 9.5 | No |
| 32% HCl, 1000 ppm $Cl_2$ | 6 | No |
| 2% Acetic Acid @ 20°–50° C. | | |
| 80° C. molten monochloroacetic acid | 7.5 | No |
| Chloroacetic acid | 6 | No |
| 150 lb steam @ 358° F. | 2 | No |
| 60% $H_2SO_4$ @ 90°–120° C. S, Br | 2 | Yes |
| 22% brine, 10–100 ppm $Cl_2$, pH 4–8, 100° C. | 4.5 | No |
| Hot HCl gas | 4 | No |
| 127 ft/sec steam @ 100° C. | 1 week | No |
| Chloromethyl methyl ether 50° C. | 2 | No |

What is claimed is:

1. A method of applying a vermicular expanded graphite composite material to the interior surface of a conduit comprising:
   (a) providing a supply of a vermicular expanded graphite composite material containing from about 3 to about 50 percent by weight of a corrosion resistant resin;
   (b) positioning within the interior of said conduit a pressure actuated resiliently expandable element having substantially the same longitudinal dimension and substantially the same peripheral contour as the interior surface of said conduit, but said element having an initial outside diameter smaller than the inside diameter of said conduit;
   (c) charging said vermicular expanded graphite composite material into the interior of said conduit such that said composite material is loosely disposed within the annular space formed between the internal surface of said conduit and the outer surface of said pressure actuated resiliently expandable element;
   (d) applying sufficient pressure within said expandable element to compress said composite material against the interior surface of said conduit; and
   (e) isostatically compressing said composite material under sufficient pressure to form a substantially smooth fluid impervious lining of said composite material on the interior surface of said conduit.

2. The method of claim 1 wherein the composite material is compressed in step (d) at a pressure of from about 100 to about 1000 pounds per square inch.

3. The method of claim 2 wherein the composite material is compressed in step (d) at a pressure of from about 100 to about 500 pounds per square inch.

4. The method of claim 1 wherein the composite material is isostatically compressed at a pressure of from about 5000 to about 100,000 pounds per square inch.

5. The method of claim 1 including evacuating the annular space between the interior surface of the conduit and the outer surface of the pressure actuated resiliently expandable element prior to compressing the composite material in step (d).

6. The method of claim 1 including repeating steps (c) and (d) until a plurality of superimposed composite layers of predetermined thickness are compressed on the interior surface of said conduit.

7. The method of claim 1 including subjecting said composite material from step (d) to sufficient vacuum to remove substantially all air from said composite material prior to isostatic compression.

8. The method of claim 1 including agglomerating the composite material from step (a) prior to introduction into the annular space.

9. A method of applying a vermicular expanded graphite composite material to the interior surface of a conduit having flanged end portions comprising:
   (a) providing a supply of a vermicular expanded graphite composite material containing from about 3 to about 50 percent by weight of a corrosion resistant resin;
   (b) providing a pre-compressed vermicular expanded graphite composite structure, the contour of which substantially conforms to the interior surface and the flanged end portions of said conduit, the longitudinal dimension of said structure being substantially less than the longitudinal dimension of said conduit;
   (c) positioning said pre-compressed structure within the interior of said conduit at each flanged end portion;
   (d) positioning within the interior of said conduit a pressure actuated resiliently expandable element having substantially the same longitudinal dimension and substantially the same peripheral contour as the interior surface of said conduit, but said element having an initial outside diameter smaller than the inside diameter of said conduit;
   (e) charging said vermicular expanded graphite composite material into the interior of said conduit such that said composite material is loosely disposed within the annular space formed between the internal surface of said conduit and the outer surface of said pressure actuated resiliently expandable element;
   (f) applying sufficient pressure within said expandable element to compress said composite material against the interior surface of said conduit; and
   (g) isostatically compressing said composite material and said precompressed structure under sufficient pressure to form a substantially smooth fluid impervious lining of said composite material on the interior surface and flanged portion of said conduit.

10. A method of applying vermicular expanded graphite composite material particles to the interior surface of a conduit comprising:
(a) providing a supply of a vermicular expanded graphite composite material containing from about 3 to about 50 percent by weight of a corrosion resistant resin;
(b) positioning within the interior of said conduit a pressure actuated resiliently expandable element having substantially the same longitudinal dimension and substantially the same peripheral contour as the interior surface of said conduit, but said element having an initial outside diameter smaller than the inside diameter of said conduit;
(c) charging said vermicular expanded graphite composite material into the interior of said conduit such tht said composite material is loosely disposed within the annular space formed between the internal surface of said conduit and the outer surface of said pressure actuated resiliently expandable element;
(d) applying sufficient pressure within said expandable element to compress said composite material against the interior surface of said conduit; and
(e) isostatically compressing said composite layer under sufficient pressure to form a substantially smooth fluid impervious lining of said composite material on the interior surface of said conduit.

* * * * *